United States Patent
Folk-Williams et al.

(10) Patent No.: US 6,834,287 B1
(45) Date of Patent: Dec. 21, 2004

(54) CLASSIFICATION ENGINE FOR MANAGING ATTRIBUTE-BASED DATA

(75) Inventors: Ben Folk-Williams, Austin, TX (US); Jimmy Wan, Austin, TX (US)

(73) Assignee: Trilogy Development Group, Inc., Austin, TX (US)

( * ) Notice: Subject to any disclaimer, the term of this patent is extended or adjusted under 35 U.S.C. 154(b) by 251 days.

(21) Appl. No.: 09/805,871

(22) Filed: Mar. 14, 2001

(51) Int. Cl.$^7$ .............................................. G06F 17/30
(52) U.S. Cl. ..................... 707/103 Z; 707/5; 707/10
(58) Field of Search ................... 707/100, 102, 707/103 Y, 103, 103 Z, 5, 10

(56) References Cited

U.S. PATENT DOCUMENTS

| | | | | |
|---|---|---|---|---|
| 5,835,910 A | * | 11/1998 | Kavanagh et al. | 707/103 R |
| 5,857,197 A | * | 1/1999 | Mullins | 707/103 R |
| 5,895,459 A | * | 4/1999 | Enomoto | 706/10 |
| 6,012,067 A | * | 1/2000 | Sarkar | 707/103 R |
| 6,061,515 A | * | 5/2000 | Chang et al. | 717/114 |
| 6,063,128 A | * | 5/2000 | Bentley et al. | 703/6 |
| 6,070,197 A | * | 5/2000 | Cobb et al. | 709/315 |
| 6,122,627 A | * | 9/2000 | Carey et al. | 707/4 |
| 6,134,540 A | * | 10/2000 | Carey et al. | 707/2 |
| 6,199,195 B1 | * | 3/2001 | Goodwin et al. | 717/104 |
| 6,226,637 B1 | * | 5/2001 | Carey et al. | 707/4 |
| 6,418,448 B1 | * | 7/2002 | Sarkar | 707/104.1 |
| 6,523,027 B1 | * | 2/2003 | Underwood | 707/4 |

* cited by examiner

*Primary Examiner*—Uyen Le
*Assistant Examiner*—Hanh Thai
(74) *Attorney, Agent, or Firm*—Hamilton & Terrile, LLP; Kent B. Chambers (57) ABSTRACT

A classification engine provides flexible support for manipulation of attribute-based data by dynamic generation of SQL with classifiers constructed from different schema objects representing different database schemas. The classifiers may be constructed by defining classifiers corresponding to the database schema, and mapping the classifiers to columns on tables in the database. The invention also allows a classification system to modify the database structure and easily conform the classification engine to the modified structure without recompiling the engine or rewriting the application that use the classification system. The engine is conformed to the new structure by constructing a second schema object for the modified database. The schema objects are preferably defined using a field-based language such as extensible markup language (XML).

58 Claims, 5 Drawing Sheets

CLASSIFICATION ENGINE FOR MANAGING ATTRIBUTE-BASED DATA

BACKGROUND OF THE INVENTION

1. Field of the Invention

The present invention generally relates to computer systems and computer databases, and more specifically to a software engine that may be used by various application programs as the primary interface for viewing, searching, and modifying information stored in databases, particularly relational databases which are used to maintain electronic catalogs.

2. Description of the Related Art

Computer systems use databases to maintain information for a wide variety of purposes. A database may generally be thought of as a file composed of one or more records, each containing fields, together with a set of operations used for searching, sorting, recombining, and other functions. Data in a typical relational database can be represented as a set of records (entries) spread out across multiple tables. Entries in a table are comprised of values for several data columns. The database has a definition for each table which dictates the format of records in the database, including the number of fields, specifications regarding the type of data that can be entered in each field (e.g., numeric or alphabetical), and the field names used. A database is physically stored on any conventional computer storage medium, such as a hard disk drive. A database server (a network node or workstation) may be dedicated to storing and providing access to a shared database.

Applications can be custom-written to access a database having a particular schema (the format of the database). Alternatively, a database engine (a program module or modules) is often used to provide access to a database management system. The database management system (DBMS) is the software interface between the database and the user. A database management system (or database manager) handles user requests for database actions, and allows for control of security and data integrity requirements.

One important use for databases is in electronic catalogs. With the explosive growth in the number of users of the Internet, particularly the World Wide Web (WWW), many retailers are taking advantage of the opportunity to present goods and services to consumers via this new purchasing medium (e-commerce). Online catalogs are often represented as a hierarchy or tree wherein each level of the hierarchy represents a slightly more specific classification about particular products If available in the catalog. For example, products from an automobile dealership might first be categorized according to the particular vendor (manufacturer), then according to a particular body style, and then according to a particular color. Information regarding all of the available cars/trucks accessed through a database by the web server or application server, and updated periodically. Users are able to search the catalog using limited search criteria based on the available fields.

Figure 1:
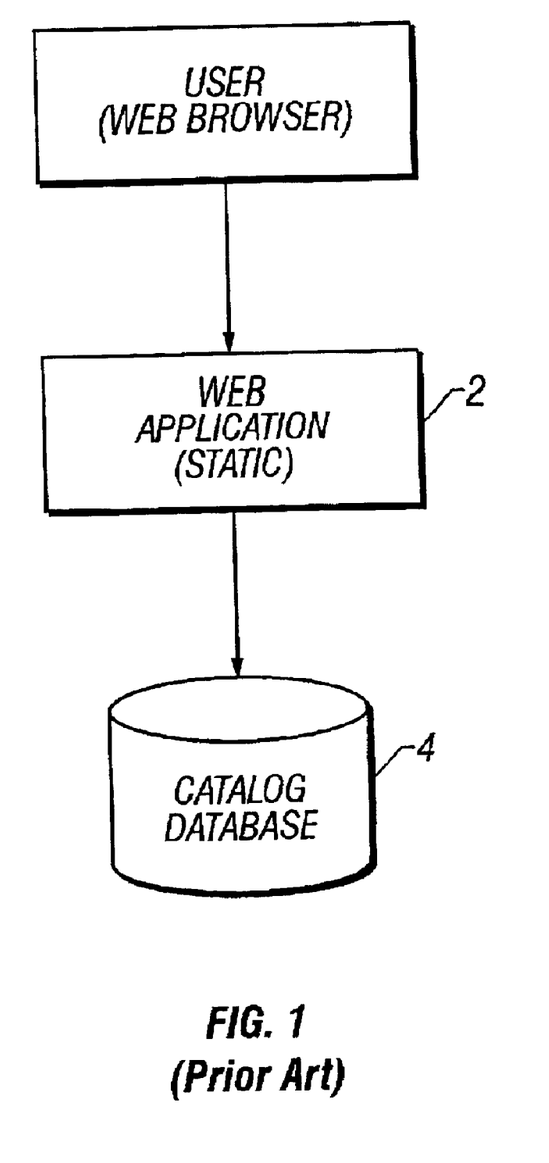
FIG. 1 is a block diagram of a simple prior art electronic catalog system, wherein a static web application directly manages a catalog database.

As suggested above, and as illustrated in FIG. 1, a web application 2 may be customized to directly access a catalog database 4. In this situation, the web application is programmed based on the knowledge of the specific database structure of the catalog database, i.e., the number of total database files in the overall database 4, and the fields in each of the database files. Web application 2 can include a search function that formulates a request based on user inputs, and generates a query to catalog database 4 according to a static list of attributes.

Figure 2:
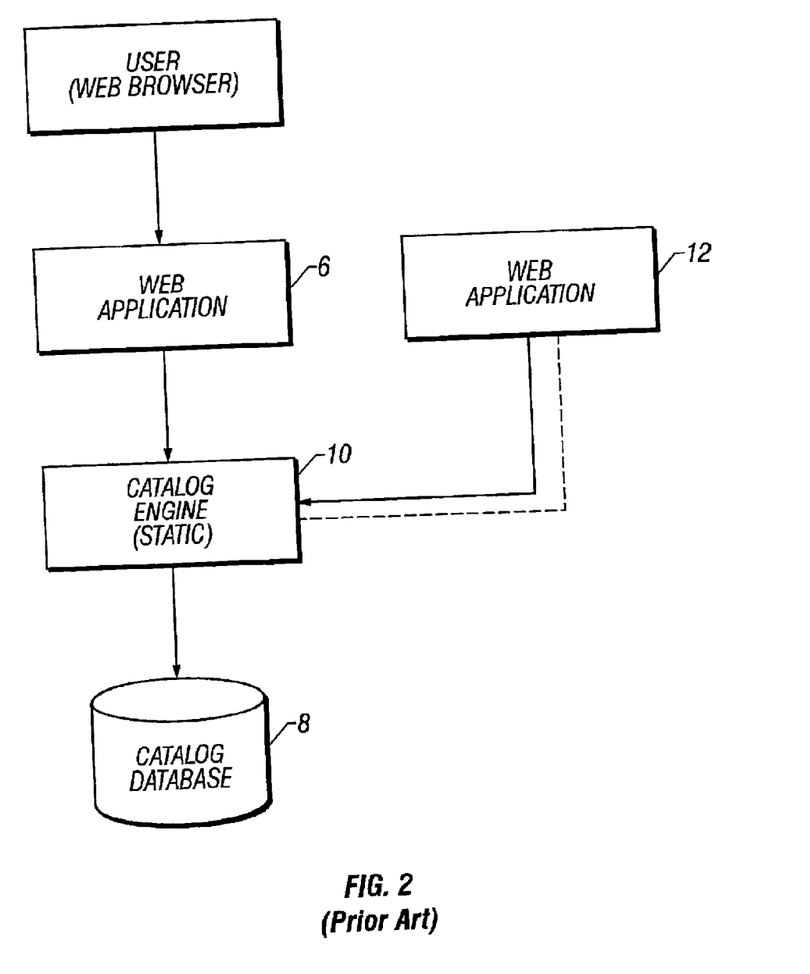
FIG. 2 is a block diagram of another prior art electronic catalog system, wherein a static catalog engine provides an interface between the web application and the catalog database.

As further suggested above, and as illustrated in FIG. 2, a web application 6 may be designed to access a catalog database 8 via a catalog engine 10. In this situation, web application 6 need not be programmed according to the specific database structure of catalog database 8. Rather, web application 6 is only required to interface with catalog engine 10, which is then responsible for interacting with the database. For example, a conventional catalog engine might be used to carry out search operations by generating a SQL query. A SQL query uses structured query language, a database language that has become the standard for most database products. Catalog engine 10 may be used by other applications as well, such as another web application 12 (or a Java applet, etc.).

Figure 3:
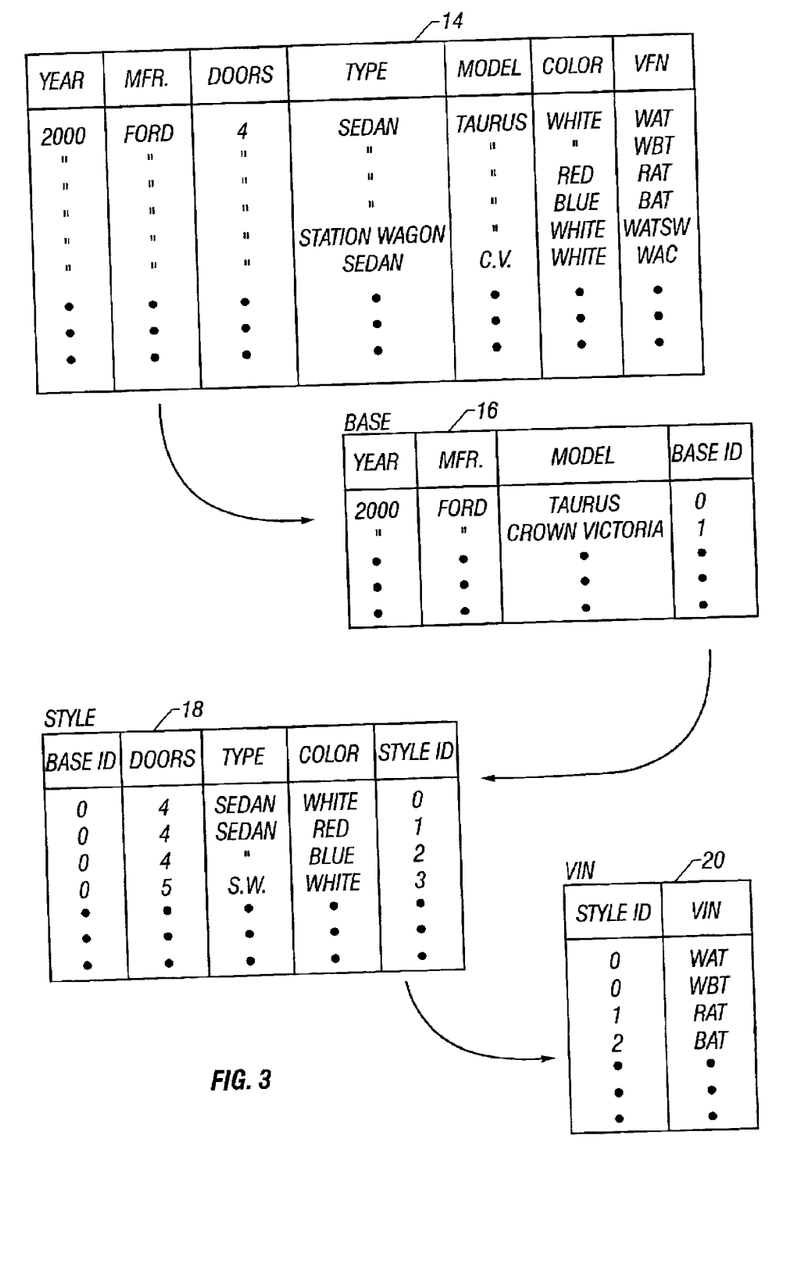
FIG. 3 is a representation of the conversion of an exemplary catalog database from an old single-table schema to a new 3-table schema.

One major problem with these electronic catalog systems relates to the fixed manner in which the application, or the catalog engine, interfaces with the catalog database. The structure (schema) of the database may need to be changed, in order to optimize it in a particular way, or to add new fields and capabilities. For example, FIG. 3 is a representation of the conversion of information pertaining to an automobile dealership's inventory, from a first schema with one table 14, to a second schema with three tables 16, 18 and 20. In the first schema, the single table 14 contains all the information (that is, all fields) pertaining to each record (car/truck). In this simplified example, a given record has seven fields: Year (of manufacture); Mfr. (manufacturer); Doors (the number of doors); type (the automobile body design); model (a brand name); color, and VIN (vehicle identification number).

It can be seen that the structure of the single table 14 lends itself to certain inefficiencies. While sufficient when considering a single record, it becomes extremely inefficient when looking at all of the data as an aggregate. For example, much of the stored data is redundant. The first six entries of table 14 show how the corresponding six cars are all year 2000 Ford 4-doors. The first five entries are furthermore all Taurus models. It is possible to reduce this inefficiency by creating multiple tables which are interrelated, and which effectively reuse the redundant information. In the second schema, a Base table 16 is used to collectively identify all vehicles according to their year, manufacturer, and model. A Base ID (identification) value is then assigned to each record. This Base ID is used to correlate those records with entries in a Style table 18. In this example, the first four rows of Style table 18 all have a Base ID of zero which, according to Base table 16, corresponds to any vehicle that is a year 2000 Ford Taurus. Thus, the information that pertains to the fields in Base table 16 does not have to be repeatedly included in Style table 18, reducing the redundancy. Style table 18 adds information pertaining to the number of doors, vehicle type, and color, and then assigns a Style ID to each record. The Style D is then used to access the corresponding VIN in VIN table 20. This correlation between the tables of the second schema is the essence of a relational database.

The static nature of prior art catalog applications and catalog engines makes it difficult to accommodate such changes in a database. In most cases, it will be necessary to rewrite the application or engine, which can be extremely laborious (or impossible for the end user that may not have access to the application's original code). Some prior art catalog engines can create different classifiers for different attributes, but these classifiers must conform to a fixed database format, and changes nearly always necessitate extensive import/export operations. These problems are particularly troublesome for volatile databases (whose structure might change often). It would, therefore, be desirable to devise a more flexible catalog engine that can easily support changes in the catalog database schema. It would be further advantageous if the improved catalog engine were highly scalable for very large database applications.

SUMMARY OF THE INVENTION

It is therefore one object of the present invention to provide an improved classification system.

It is another object of the present invention to provide such an improved classification system that easily accommodates changes in the underlying database schema.

It is yet another object of the present invention to provide an improved method of constructing an electronic catalog using such a classification system having schema independence, which imparts performance increases when the database is optimized for specific situations.

The foregoing objects are achieved in a method of managing a computer database (e.g., a database for an electronic catalog) generally comprising the steps of importing data into a database residing on a computer system, constructing a schema object to represent the database schema, and using an aggregate classifier to manipulate the database. The schema object may be constructed by defining a plurality of classifier definitions corresponding to specific columns and tables in the database. The classifiers may include: a "property" classifier which interacts with a single column on a single table; an "object" classifier which contains one or more of the "property" classifiers; a "split-object" classifier which makes more than one "object" classifier appear as a single classifier; a "join" classifier which identifies how multiple database objects are linked in a "split-object" classifier; and a "mapped property" classifier as a special form of the "split-object" classifier to manage data stored in a table of the database which serves as an index to another database table. Parameterized classifiers may also be defined which are templates for classifiers that are instantiated when associated parameters are provided.

The invention allows the classification system to modify the database structure and easily conform the classification engine to the modified structure without recompiling the engine or rewriting the catalog application. The engine is conformed to the new structure by constructing a second schema object for the modified database. The schema objects are preferably constructed from classifier definitions that are defined using a field-based language such as extensible markup language The above as well as additional objectives, features, and advantages of the present invention will become apparent in the following detailed written description.

BRIEF DESCRIPTION OF THE DRAWINGS

The present invention, its numerous objects, features, and advantages may be better understood, and made apparent to those skilled in the art by referencing the accompanying drawings.

The use of the same reference symbols in different drawings indicates similar or identical items.

DESCRIPTION OF THE PREFERRED EMBODIMENT(S)

Figure 4:
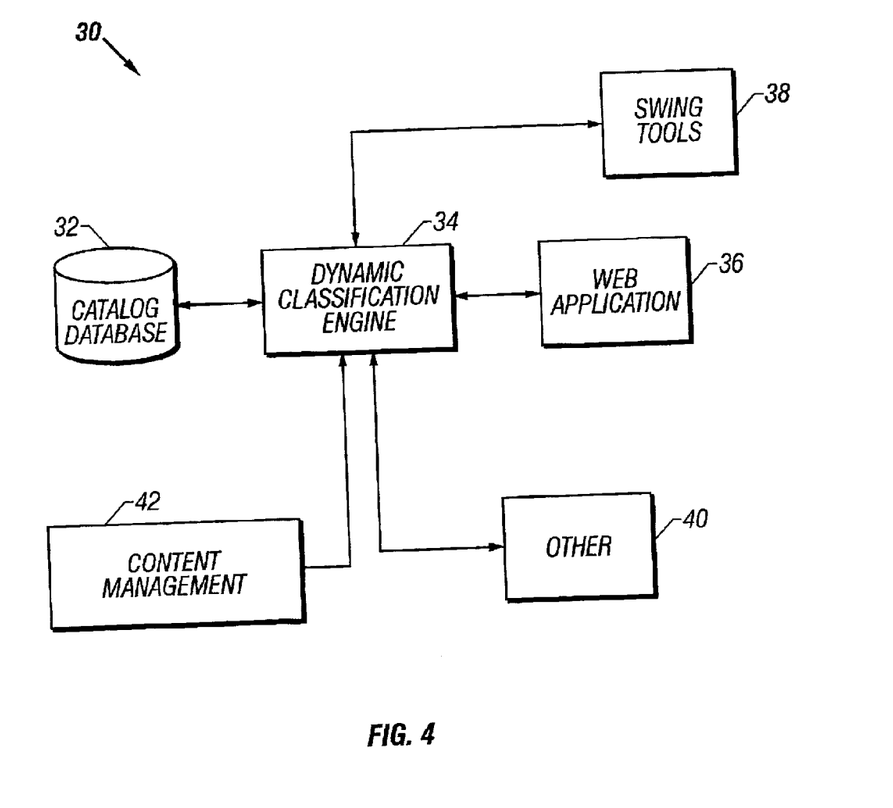
FIG. 4 is a block diagram of one implementation of an electronic catalog system constructed in accordance with the present invention, having a dynamic classification engine which easily adapts to different schemas of the underlying catalog database.

With reference now to the figures, and in particular with reference to FIG. 4, there is depicted one embodiment 30 of an electronic database system constructed in accordance with the present invention. Electronic database system 30 is generally comprised of a catalog database 32, a classification engine 34, several applications including a web application 36, swing tools 38, or other applications 40, and a content management tool 42. While the invention is described in the useful context of electronic catalogs, those skilled in the art will appreciate that it is not so limited, and will understand after reading the following description that the invention is applicable to database management in general.

In the illustrative implementation, database system 30 is adapted for e-commerce, and runs on a conventional network server which is connected to, e.g., the Internet. Thus, database system 30 is physically embodied in the program instructions and data that reside on the network media, that is, storage media (local or remote) or transmission media. The network server includes a communications device, such as an Ethernet card, one or more processing units, and system memory that temporarily stores the program instructions to be executed.

Applications 36, 38 and 40 access catalog database 32 via classification engine 34. Classification engine 34 can classify any set of information into various groups by examining different values of common properties. For example, the vehicles of the tables of FIG. 3 have attributes (classifiers) such as year, model, etc. In the present invention, classification engine 34 is dynamically modifiable to support different schemas of catalog database 32 using any desired attributes and table structures. Classification engine 34 enables this functionality by constructing a schema object which defines both the classifiers available to the engine, and the mapping between these classifiers and objects in catalog database 32.

Figure 5:
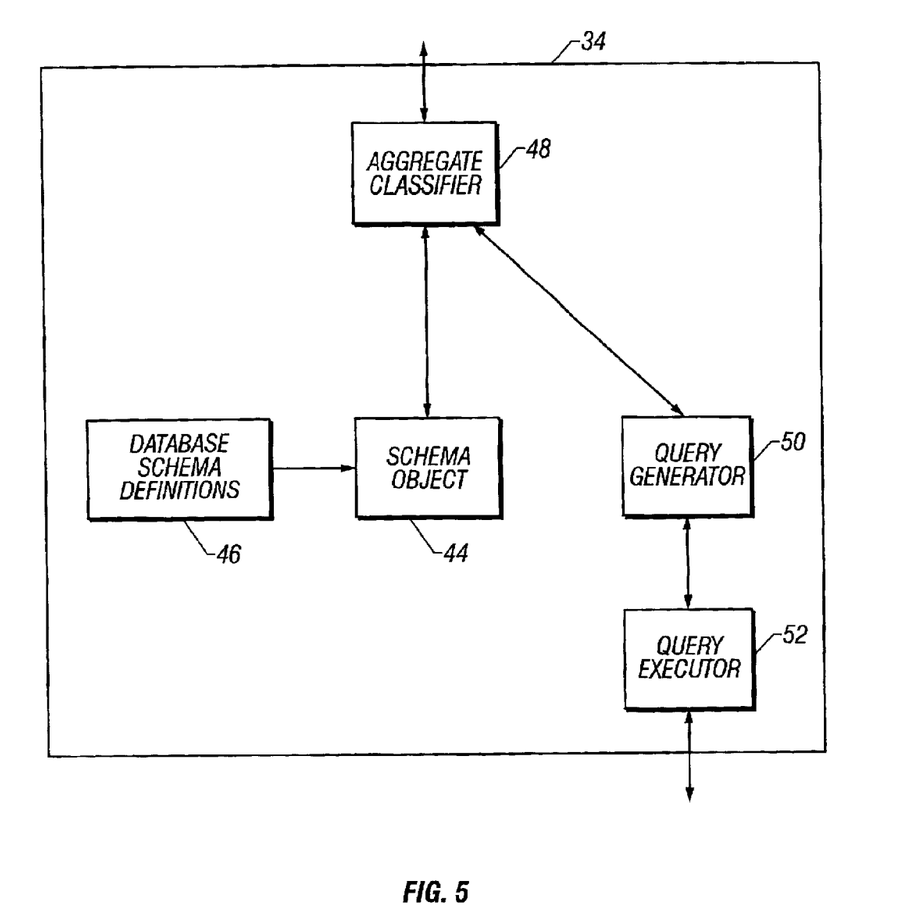
FIG. 5 is a block diagram of one embodiment of the classification engine of the present invention, which uses an XML (extensible markup language) document, representing the database schema, to construct a schema object.

As further illustrated in FIG. 5, classification engine 34 dynamically constructs the schema object 44 using database schema definitions 46 provided via an extensible markup language (XML) document. XML is a field-based language W similar to the hypertext markup language (HTML). Both of these languages provide a protocol for transmitting formatted information and control codes. Different fields within the XML document 46 are used to define the database structure and attributes, using tags. In XML, a tag is a pair of angle brackets (o) that contain one or more letters and numbers between the angle brackets. One pair of angle brackets is often placed before an element, and another pair placed after, to indicate where the element begins and ends. For example, the definition of a table structure might begin with the tag "<Table>", and end with the tag "</Table>".

The XML document instructs classification engine 34 how to map onto the database structure, and provides a convenient mechanism to easily change these mappings. Rewriting of the XML code may be understood with reference to the database conversion example of FIG. 3. For the original schema, the XML code might appear as follows:

```
<Table name = OldCarSchema>
    <Property name = "Model Year"
        Column name = "Year"/>
    <Property name = "Manufacturer"
        Column name = "Mfr"/>
    . . .
</Table>
```

This original code defines a single table (named "OldCarSchema") with the various attributes (only two of which are shown above, with the others indicated by the ellipses). For the second schema, the XML code might appear as follows:

```
<Composite_Object name = "NewCarSchema">    Composite_Object
    <Table name = Base>
        <Property name = "Model Year"
        . . .
    </Table>
    <Table name = Style>
        <Property name = "Doors"
        . . .
    </Table>
    . . .
</Composite_Object>
```

In this modified code, a composite object (named "NewCarSchema") has multiple tables (only two of which are shown above), and each table has defined attributes.

By defining the schma in XML, it is not necessary to recompile code when modifying the underlying database structure. XML document 46 need only be updated so that it refers to the correct objects, and the application will then work without any further changes. To create a schema object, the XML documentation 46 is examined to define the set of classifier definitions. Classification engine 34 may provide many different standard classifier objects to handle a variety of different situations. Each kind of classifier is generally built to handle one kind of data. In the illustrative embodiment, the most granular classifier is the "property" at Q classifier, which maps to a single column on a single table in the database. Higher-level classifiers contain one or more lower-level classifiers. For example, the "object" classifier contains one or more "property" classifiers. Any classifier that contains other classifiers is referred to herein as an aggregate classifier.

Other standard classifiers built-in to classification engine 34 include: a "split-object" classifier; a "join" classifier; a "mapped property" classifier; and a generic aggregate classifier. The "split-object" classifier makes more than one database object appear as a single classifier, while a "join" classifier defines how multiple "object" classifiers should be linked in a "split-object" classifier. The "mapped property" classifiers are a special form of the "split-object" classifiers which are used to manage data stored in a table which serves as an index to another database table (e.g., the Base ID or Style ID fields in the second schema of FIG. 3). Parameterized classifiers may also be used to generate classifiers on-the-fly, at run time. Parameterized classifiers utilize a template defined in XML, but they cannot be used in code until after the parameters have been provided. They are instantiated when the additional information is complete. Other classifiers may be designed by the end user, e.g., by extending the provided Java classes and adding customized functionality.

An XML document can also be used for importing data, i.e., modifying the contents (rather than structure) of catalog database 32. The import tool in classification engine 34 can import data into any kind of database that can be represented by an instance of database schema definitions 46. The import tool can be used even if the classification engine itself will not be used to view or manipulate this data once it has been imported into the database. The import tool determines the proper SQL based on the database schema definitions previously used in designing the database schema. The <Create/> tag can be used to add data. The Delete/> tag can be used to remove records from the database. The <Modify/> tag can be used to manipulate records already in the database. The code that sets up the classifier values may also be nested to avoid redundant specification of related attributes on multiple records to be created, for example:

```
<!-- Specifies that the value 2000 is to be associated with the classifier "year" -->
<Classifier name="Year" value="2000">
    <Classifier name= "Mfr" value= "Ford">
        <Classifier name= "Doors" value "4">
            <Classifier name= "Type" value= "Sedan">
                <Classifier name= "Model" value= "Taurus">
                    <Classifier name= "Color" value= "Whte">
                        <Classifier name="VIN" value="WAT">
                            <Create/>
                        </Classifier>
                    </Classifier>
                    <Classifier name= "Color" value = "Red">
                        <Classifier name="VIN" value="RAT">
                            <Create/>
                        </Classifier>
                    </Classifier>
                </Classifier>
            </Classifier>
        </Classifier>
    </Classifier>
</Classifier>
```

Classification engine 34 also handles catalog searches handed down from the various web applications. The engine's interface to the application works with a tops level object (e.g., "CompositeObject"). The engine is able to work with an abstract set of attributes regardless of the location in the database schema. When an application uses classification engine 34, it passes a request to classification engine 34 to obtain an aggregate classifier based on a given schema object. The schema object creates an aggregate classifier based on its classifier definitions and returns it to the application. The application then passes a series of one or more requests to the aggregate classifier 48. Aggregate classifier 48 receives these requests and interrogates schema object 44 to find the locations of different classifiers. Schema object 44 returns the location information, e.g., that the "VIN" classifier is in the VIN table, the "Color" classifier is in the Style table, etc. Aggregate classifier 48 then takes the search constraints from the request, e.g., numdoors>2, model="Taurus", associates them with the relevant columns in the database tables, and passes this information to a query generator 50. Query generator 50 converts the request to a SQL query. Conventional numeric, string, and Boolean operators may be used in the query. The engine generates the SQL query by comparing the user input with the schema, e.g.:

```
SELECT VINTable.VIN, Style.Color, Base.Year
FROM VINTable, Style, Base
WHERE VINTable.StyleID = Style.StyleID AND
    Style.BaseID = Base.BaseID AND
    Style.Doors>2 AND
    Base.Model = "Taurus"
```

This query requests the vehicle identification numbers, colors, and years of manufacture for all cars that are of the model "Taurus" and have more than two doors (i.e., the 4-door sedans, and the 5-door station wagon).

A query executor 52 carries out the query by communicating directly with catalog database 32. Query executor 52 also processes the results from the database, and returns the processed data to aggregate classifier 48. Aggregate classifier in turn passes the results to the requesting application.

The present invention provides a flexible classification engine that may easily be adapted for use with any database schema, including that of a complete legacy database. Parametric searches can be performed across multiple attributes. All of this functionality is can be adapted to new database schemas without recompiling, by simply re-writing the XML document containing the classifier definitions. An application only has to interact with the classification engine, and need know nothing regarding the schema of the database. The engine also scales to large databases and large numbers of users with little or no difficulty, since most of the engine's operating data can be shared among different users of the system.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method allowing application programs to access a database using intermediary code that provides information associated with a schema of the database to the application proprams, the method comprising:

receiving a request to the intermediary code from one of the application programs to access the database;

providing to the requesting application data that includes the information associated with a schema of the database, wherein the information includes classifiers corresponding to columns and tables in the database;

receiving one or more requests from the requesting application relating to transferring data between the requesting application and the database;

interrogating a schema object to obtain location information for classifiers in the database that are associated with the one or more requests;

providing the location information of the classifiers to the requesting application; associating data search constraints from the one or more requests of the requesting application with locations in the database; and generating a query to the database based on the search constraints.

2. The method of claim 1 further comprising:

importing data into the database, wherein the database resides on a computer system;

constructing the schema object to represent a schema of the database; and manipulating the database using an aggregate classifier based on the schema object, wherein the aggregate classifier includes multiple classifiers of the database.

3. The method of claim 1 further comprising:

defining a plurality of classifier definitions corresponding to the schema of the database; and mapping the classifier definitions to columns and tables in the database.

4. The method of claim 3 wherein said defining step defines a "property" classifier which interacts with a single column on a single table in the database.

5. The method of claim 4 wherein said defining step further defines an "object" classifier which contains one or more of the "property" classifiers.

6. The method of claim 4 wherein said defining step defines a "split-object" classifier which makes more than one "object" classifier appear as a single classifier.

7. The method of claim 6, wherein said defining step further defines a "join" classifier which identifies how multiple "object" classifiers database objects are linked in a "split-object" classifier.

8. The method of claim 6 wherein said defining step defines a "mapped property" classifier as a special form of the "split-object" classifier to manage data stored in a table of the database which serves as an index to another database table.

9. The method of claim 3 wherein said defining step defines a parameterized classifier which is a template for classifiers that are instantiated when associated parameters are provided.

10. The method of claim 2 further comprising the steps of modifying the schema of the database;

constructing a second schema object for the modified database; and manipulating the modified database using the second schema object.

11. The method of claim 10 wherein said step of constructing the second schema object includes the step of re-writing classification definitions of the database, wherein the definitions are stored on the computer system.

12. The method of claim 2 wherein said constructing step includes the step of writing classification definitions stored on the computer system using a field-based language.

13. The method of claim 12 wherein said writing step uses XML.

14. By The method of claim 2 wherein said constructing step includes the step of writing database classification definitions stored on the computer system.

15. The method of claim 2 wherein said importing step parses an import file to import the data.

16. The method of claim 14 wherein said manipulating step includes the step of an application, residing on the computer system, interacting with a composite object included in the classification definitions.

17. The method of claim 2 wherein said manipulating step includes the step of generating a SQL SELECT query using a query generator of the intermediary code.

18. The method of claim 2 wherein said manipulating step includes the step of generating a SQL INSERT query using a query generator.

19. The method of claim 2 wherein said manipulating step includes the step of generating a SQL UPDATE query using a query generator.

20. The method of claim 2 wherein said manipulating step includes the step of generating a SQL DELETE query using a query generator.

21. The method of claim 17 wherein said generating step includes the step of an aggregate classifier interrogating the schema object to determine how different classifiers correspond to columns and tables in the database.

22. The method of claim 1 further comprising:
returning results of the query to the requesting application.

23. The method of claim 1 wherein the intermediary code is a software enabled classification engine.

24. A computer system comprising:
a database;
a memory storing program instructions that allow application programs to access the database through a database classification engine that provides information associated with a schema of the database to the application programs, the program instructions being executable to:
receive a request to the database classification engine from one of the application programs to access the database;
provide to the requesting application data that includes the information associated with a schema of the database, wherein the information includes classifiers corresponding to columns and tables in the database;
receive one or more requests from the requesting application relating to transferring data between the requesting application and the database;
interrogate a schema object to obtain location information for classifiers in the database that are associated with the one or more requests;
provide the location information of the classifiers to the requesting application;
associate data search constraints from the one or more requests of the requesting application with locations in the database; and
generate a query to the database based on the search constraints; and
a processor coupled to the memory to process the instructions.

25. The computer system of claim 14 further comprising:
program instructions stored in the memory and adapted to construct the schema object to represent the schema of the database, and manipulate the database using an aggregate classifier based on the schema object.

26. The computer system of claim 24 wherein the program instructions define a plurality of classifiers corresponding to the schema of the database, and map the classifiers to tables in the database.

27. The computer system of claim 26 wherein the program instructions further define a "property" classifier which interacts with a single column on a single table in the database.

28. The computer system of claim 27 wherein the program instructions further define an "object" classifier which contains one or more of the "property" classifiers.

29. The computer system of claim 26 wherein the program instructions further define a "split-object" classifier which makes more than one "object" classifier appear as a single classifier.

30. The computer system of claim 29 wherein the program instructions further define a "join" classifier which identifies how multiple "object" classifiers are linked in a "split-object" classifier.

31. The computer system of claim 29 wherein the program instructions further define a "mapped property" classifier as a special form of the "split-object" classifier to manage data stored in a table of the database which serves as an index to another database table.

32. The computer system of claim 26 wherein the program instructions further define a parameterized classifier which is instantiated when associated parameters are provided.

33. The computer system of claim 25 wherein the program instructions construct a second schema object when a structure of the database is modified.

34. The computer system of claim 33 wherein the program instructions construct the second schema object by re-writing classification definitions stored in the memory.

35. The computer system of claim 25 wherein the program instructions construct the schema object by writing classification definitions stored on the computer system using a field-based language.

36. The computer system of claim 25 wherein the program instructions generate a SQL SELECT query using a query generator of the classification engine.

37. The computer system of claim 25 wherein said manipulating step includes the step of generating a SQL INSERT query using a query generator.

38. The computer system of claim 25 wherein said manipulating step includes the step of generating a SQL UPDATE query using a query generator.

39. The computer system of claim 25 wherein said manipulating step includes the step of generating a SQL DELETE query using a query generator.

40. The computer system of claim 36 wherein the program instructions further direct an aggregate classifier to interrogate the schema object to determine how different classifiers correspond to columns and tables in the database.

41. The computer system of claim 25 wherein the program instructions construct a composite object to interact with an application program residing in said memory.

42. The computer system of claim 24 wherein the program instructions further comprise instructions to return results of the query to the requesting application.

43. A computer program product comprising:
a computer readable storage medium storing program instructions for allowing application programs to access a database through a database classification engine that provides information associated with a schema of the database to the application programs, the program instructions being executable to:
- receive a request to the database classification engine from one of the application programs to access the database;
- provide to the requesting application data that includes the information associated with a schema of the database, wherein the information includes classifiers corresponding to columns and tables in the database;
- receive one or more requests from the requesting application relating to transferring data between the requesting application and the database;
- interrogate a schema object to obtain location information for classifiers in the database that are associated with the one or more requests;
- provide the location information of the classifiers to the requesting application;
- associate data search constraints from the one or more requests of the requesting application with locations in the database; and
- generate a query to the database based on the search constraints.

44. The computer program product of claim 43 further comprising:
program instructions stored on said storage medium for constructing the schema object to represent the schema of the database residing on a computer system, and manipulating the database using the an aggregate classifier based on the schema object.

45. The computer program product of claim 43 wherein the program instructions define a plurality of classifiers corresponding to the schema of the database; and map the classifiers to tables in the database.

46. The computer program product of claim 45 wherein the program instructions further define a "property" classifier that interacts with only a single column on a single table in the database.

47. The computer program product of claim 46 wherein the program instructions further define an "object" classifier which contains one or more of the "property" classifiers.

48. The computer program product of claim 45 wherein the program instructions further define a "split-object" classifier which makes more than one "object" classifier appear as a single classifier.

49. The computer program product of claim 48 wherein the program instructions further define a "join" classifier which identifies how multiple "object classifiers" are linked in a "split-object" classifier.

50. The computer program product of claim 48 wherein the program instructions further define a "mapped property" classifier as a special form of the "split-object" classifier to manage data stored in a table of the database which serves as an index to another database table.

51. The computer program product of claim 45 wherein the program instructions further define a parameterized classifier which is instantiated when associated parameters are provided.

52. The computer program product of claim 44 wherein the program instructions construct a second schema object when a structure of the database is modified.

53. The computer program product of claim 52 wherein the program instructions construct the second schema object by re-writing classification definitions stored on the computer system.

54. The computer program product of claim 44 wherein the program instructions construct the schema object by writing classification definitions stored on the computer system using a field-based-language.

55. The computer program product of claim 44 wherein the program instructions generate a search query using the schema object.

56. The computer program product of claim 55 wherein the program instructions further direct an aggregate classifier to interrogate the schema object to determine locations of different classifiers in the database.

57. The computer program product of claim 44 wherein the program instructions construct a composite object to interact with an application program residing on the computer system.

58. The computer system of claim 43 wherein the program instructions further comprise instructions to return results of the query to the requesting application.

* * * * *